United States Patent
Li et al.

(10) Patent No.: US 11,559,140 B1
(45) Date of Patent: Jan. 24, 2023

(54) WATERPROOF PAD AND WATERPROOF STRUCTURE FOR A CABINET UNDER A SINK

(71) Applicant: SHENZHEN HENGZECHEN TECHNOLOGY CO., LTD, Shenzhen (CN)

(72) Inventors: Songhua Li, Shenzhen (CN); Yingwu Li, Chibi (CN)

(73) Assignee: SHENZHEN HENGZECHEN TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/863,029

(22) Filed: Jul. 12, 2022

(30) Foreign Application Priority Data

Aug. 3, 2021 (CN) .......................... 202121796112.4

(51) Int. Cl.
*A47B 97/00* (2006.01)
(52) U.S. Cl.
CPC .................................. *A47B 97/00* (2013.01)
(58) Field of Classification Search
CPC .. A47B 97/00; E03C 1/24; B65D 1/34; A47L 15/421; A47L 15/4212
See application file for complete search history.

(56) References Cited

U.S. PATENT DOCUMENTS

| | | | | |
|---|---|---|---|---|
| 4,369,532 A * | 1/1983 | Houchins | ............... | A47B 77/06 4/639 |
| 5,437,303 A * | 8/1995 | Johnson | ............... | D06F 39/081 4/251.1 |
| 5,577,539 A * | 11/1996 | Shaw | .................. | B67C 11/02 D15/150 |
| 5,641,118 A * | 6/1997 | Benham | ................ | B65D 5/545 229/207 |
| 5,883,300 A * | 3/1999 | Johnson | ................... | B60R 5/04 73/40 |
| 6,059,387 A * | 5/2000 | Echard | ................... | A47B 77/08 220/571 |
| 6,116,266 A * | 9/2000 | Dickison | .............. | F16N 31/006 137/574 |
| 6,412,638 B1* | 7/2002 | Carter | .................... | B65D 1/34 220/571 |

(Continued)

FOREIGN PATENT DOCUMENTS

WO     WO-2010132118 A2 * 11/2010 ............. A47B 97/00

*Primary Examiner* — Daniel J Rohrhoff
(74) *Attorney, Agent, or Firm* — Li & Cai Intellectual Property (USA) Office

(57) ABSTRACT

The present disclosure is related to a waterproof pad and a waterproof structure for a cabinet under a sink. The waterproof pad includes a pad body and a waterproof fence, wherein the waterproof fence is arranged around an edge of the pad body, the pad body is further provided with a drainage hole, and the drainage hole is located close to the waterproof fence; and wherein the drainage hole is in a convex shape when receiving water, and the drainage hole is folded downward to be in a concave shape when draining water. When the drainage hole is in a convex shape, a periphery of the drainage hole is provided with a groove that is recessed and an up-down folding function is embodied through the groove. The drainage hole is hemispherical A height of the drainage hole is at least equal to a height of the waterproof fence.

20 Claims, 7 Drawing Sheets

(56) References Cited

U.S. PATENT DOCUMENTS

| | | | | |
|---|---|---|---|---|
| 7,735,510 B1* | 6/2010 | Carter | ............. | A47B 97/00 220/571 |
| 8,376,178 B2* | 2/2013 | Steinberg | ............. | A47L 15/4212 220/558 |
| 8,823,532 B1* | 9/2014 | Carlblom | ............. | G01M 3/18 73/40 |
| 8,905,057 B2* | 12/2014 | Sass | ............. | A47L 15/4212 137/551 |
| 10,000,883 B1* | 6/2018 | Nolan | ............. | B65D 1/34 |
| 10,159,396 B1* | 12/2018 | Gunn | ............. | D06F 39/125 |
| 2004/0154661 A1* | 8/2004 | Cohen | ............. | A01N 59/04 137/312 |
| 2007/0169256 A1* | 7/2007 | Arraz | ............. | A47B 77/06 4/251.1 |
| 2007/0272302 A1* | 11/2007 | Carter | ............. | A47B 97/00 137/312 |
| 2008/0055112 A1* | 3/2008 | McGinty | ............. | A47L 15/4212 340/870.16 |
| 2008/0224581 A1* | 9/2008 | Minerva | ............. | A47B 97/00 312/229 |
| 2009/0107874 A1* | 4/2009 | Wolfe | ............. | B65D 11/10 206/557 |
| 2009/0183784 A1* | 7/2009 | Merrell | ............. | A47K 1/06 137/362 |
| 2009/0261108 A1* | 10/2009 | Steinberg | ............. | A47L 15/4212 220/571 |
| 2010/0018980 A1* | 1/2010 | Oakner | ............. | F24F 13/22 220/571 |
| 2010/0243661 A1* | 9/2010 | Upham | ............. | F24H 9/0094 220/571 |
| 2010/0275820 A1* | 11/2010 | Damm | ............. | A47B 97/00 108/24 |
| 2013/0098470 A1* | 4/2013 | Sass | ............. | A47L 15/4212 137/15.01 |
| 2015/0330699 A1* | 11/2015 | Hawley, III | ............. | F25D 21/14 220/571 |
| 2017/0112284 A1* | 4/2017 | Stevens, Jr. | ............. | A47B 97/00 |
| 2018/0320352 A1* | 11/2018 | Clifford | ............. | E03C 1/32 |
| 2020/0337500 A1* | 10/2020 | Montgomery | ............. | A47J 37/108 |
| 2022/0151386 A1* | 5/2022 | Martinez | ............. | A47B 97/00 |

* cited by examiner

WATERPROOF PAD AND WATERPROOF STRUCTURE FOR A CABINET UNDER A SINK

FIELD OF THE DISCLOSURE

The present disclosure relates to the technical field of cabinet accessories, in particular, to a waterproof pad and a waterproof structure for a cabinet under a sink.

BACKGROUND OF THE DISCLOSURE

Cabinets under sinks in kitchens, bathrooms, etc. are not highly utilized due to the existence of water pipes under sinks. But in general families, in order to make better use of the cabinet under the sink, storage items are still stored in it. With the use of the sink, it is inevitable that there will be leakage of the water pipe under the sink. The problem of sewer leakage is universal, extensive and serious. If the water leakage problem is not repaired in time, the items in the cabinet will inevitably be damp and moldy, which will affect the use of the items, and it will also cause the cabinet to be damp and moldy, and even worse, the cabinet and the items in it will be damaged.

In the prior art, the countermeasures to solve the problem of water leakage are generally to lay a layer of plastic fiber mats covered with aluminum film, plastic water-draining glue boards, or paste a layer of self-adhesive aluminum foil on the bottom surface of the cabinet, but these film mats leak water in the sewer pipe. It cannot handle a large amount of water leakage from time to time, which will cause a large amount of water leakage to spread to the kitchen, bathroom, etc., which will bring inconvenience to cleaning; and even if these membrane pads can accommodate water leakage, there will still be the need to remove the items on the membrane pad and take out the membrane pad as a whole to clean up the received water, which is time-consuming and labor-intensive.

SUMMARY OF THE DISCLOSURE

The purpose of the present disclosure is to provide a waterproof pad and a waterproof structure for a cabinet under the sink in view of the defects and deficiencies of the prior art. The waterproof pad of the present disclosure has a drainage function, and can achieve a good effect of draining water leakage by partially removing the waterproof pad.

In order to achieve the above object, the technical solution adopted in the present disclosure is to provide a waterproof pad including a pad body and a waterproof fence, wherein the waterproof fence is arranged around an edge of the pad body, the pad body is further provided with a drainage hole, and the drainage hole is located close to the waterproof fence; and wherein the drainage hole is in the convex shape when receiving water, and the drainage hole is folded downward to be in a concave shape when draining water.

When the drainage hole is in the convex shape, a periphery of the drainage hole is provided with a groove that is recessed and an up-down folding function is embodied through the groove.

The drainage hole is hemispherical.

A height of the drainage hole is at least equal to a height of the waterproof fence.

An inner surface of the pad body has a honeycomb pattern.

A thickness of the waterproof pad is 1.8 mm and a height of the waterproof fence is 17 mm.

A material of the drainage hole is an elastomer material.
A material of the drainage hole is an elastomer material.
An overall material of the waterproof pad is an elastomer material.

A waterproof structure for a cabinet under a sink, including a waterproof pad as mentioned above.

A drainage hole is located in a middle of the edge of the waterproof pad.

When the drainage hole is in the convex shape, a periphery of the drainage hole is provided with a groove that is recessed and an up-down folding function is embodied through the groove.

The drainage hole is hemispherical.

A height of the drainage hole is at least equal to a height of the waterproof fence.

A thickness of the waterproof pad is 1.8 mm and a height of the waterproof fence is 17 mm.

An overall material of the waterproof pad is an elastomer material.

After adopting the above technical solution, the beneficial effects of the present disclosure are as follows: the present disclosure is used as a cushion in the lower cabinets such as sinks and sinks, and is made of an elastomer material such as silica gel. For the convenience of use, the edge of the waterproof pad has a drainage hole at least the same height as the waterproof fence, the drainage hole can be folded up and down, and the drainage hole is convex when receiving the leakage, so that the received leakage will not leak from the drainage hole to pollute the cabinet. When it is necessary to drain the water, the waterproof pad with the drainage hole is pulled out of the edge of the cabinet and the drainage hole is folded downward to form a concave shape, so that the received leaking water can be easily discharged from the drainage hole, which can save the user the trouble of removing the entire waterproof pad to clean up water leakage, and embody the function that a good drainage effect can be achieved by partially removing the waterproof pad.

BRIEF DESCRIPTION OF THE DRAWINGS

In order to illustrate the embodiments of the present disclosure or the technical solutions in the prior art more clearly, the following briefly introduces the accompanying drawings that are used in the description of the embodiments or the prior art. Obviously, the drawings in the following description are only some embodiments of the present disclosure. For those of ordinary skill in the art, other drawings can also be obtained based on these drawings without any creative effort.

DETAILED DESCRIPTION OF THE EXEMPLARY EMBODIMENTS

The technical solutions of the present disclosure will be clearly and completely described below with reference to the accompanying drawings. Obviously, the described embodiments are a part of the embodiments of the present disclosure, but not all of the embodiments. Based on the embodiments of the present disclosure, all other embodiments obtained by those of ordinary skill in the art without creative efforts shall fall within the protection scope of the present disclosure.

In the description of the present disclosure, it should be noted that the orientation or positional relationship indicated by the terms "center", "upper", "lower", "left", "right", "vertical", "horizontal", "inner", "outer", etc. is based on the orientation or positional relationship shown in the accompanying drawings, and is only for the convenience of describing the present disclosure and simplifying the description, rather than indicating or implying that the referred device or element must have a specific orientation, a specific orientation, and a specific orientation. The orientation configuration and operation of the device should not be construed as a limitation of the present disclosure. Furthermore, the terms "first," "second," and "third," as they appear, are for descriptive purposes only and should not be construed to indicate or imply relative importance.

In the description of the present disclosure, it should be noted that, unless otherwise expressly specified and limited, the terms "installed", "jointed" and "connected" should be understood in a broad sense, for example, it may be a fixed connection or a removable connection, or integral connection; it can be mechanical connection or electrical connection; it can be directly connected, or indirectly connected through an intermediate medium, and it can be internal communication between two components. For those of ordinary skill in the art, the specific meanings of the above terms in the present disclosure can be understood in specific situations.

The present disclosure is further described below with reference to the accompanying drawings and specific embodiments, but does not limit the scope of the present disclosure.

Example 1

Figure 1:
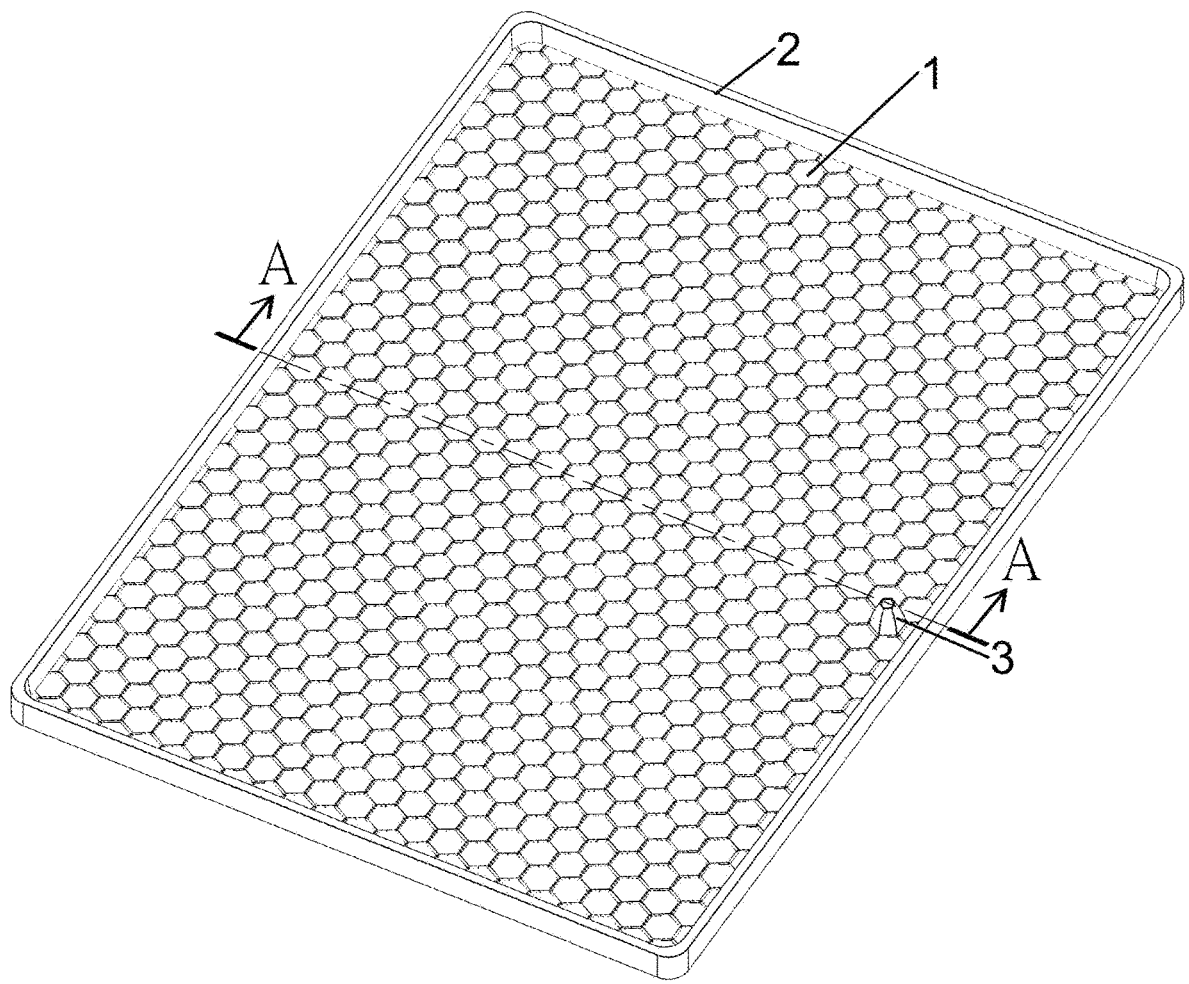
FIG. 1 is a schematic diagram of the overall structure of the waterproof pad in Example 1.
Figure 2:
FIG. 2 is the A-A cross-sectional structure schematic diagram of the waterproof pad in FIG. 1.
Figure 3:
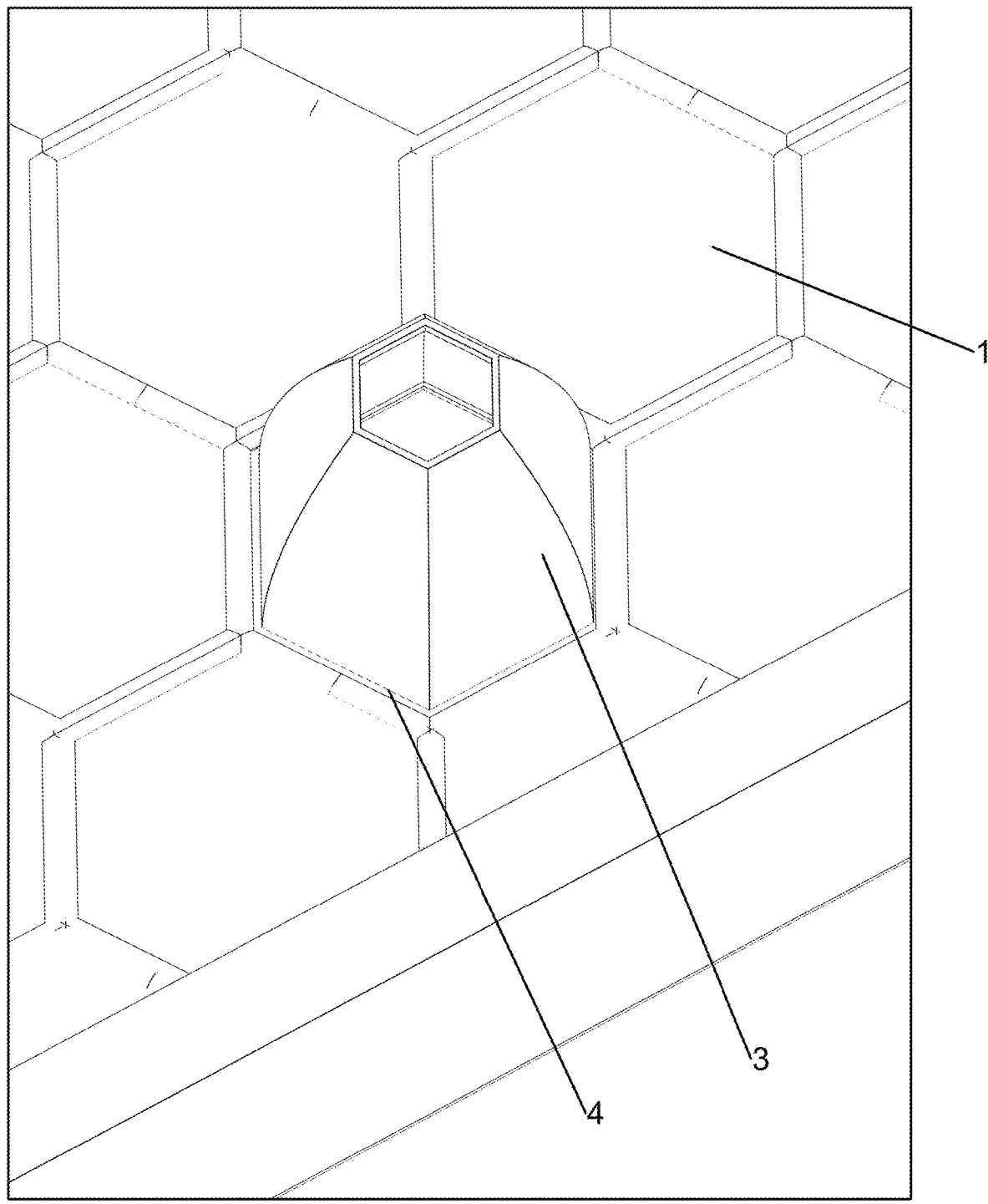
FIG. 3 is a schematic diagram of a partial three-dimensional structure with a drainage hole circled in FIG. 1.

A waterproof pad, the overall structure of which is shown in FIG. 1, the cross-sectional structure of A-A in FIG. 1 is shown in FIG. 2, and the three-dimensional structure of the circled part in FIG. 1 is shown in FIG. 3. The waterproof pad includes a pad body 1 and a waterproof fence 2; the waterproof fence 2 is arranged around the edge of the pad body 1, and the pad body 1 also has a drainage hole 3, and the drainage hole 3 is located close to the waterproof fence 2.

Figure 4:
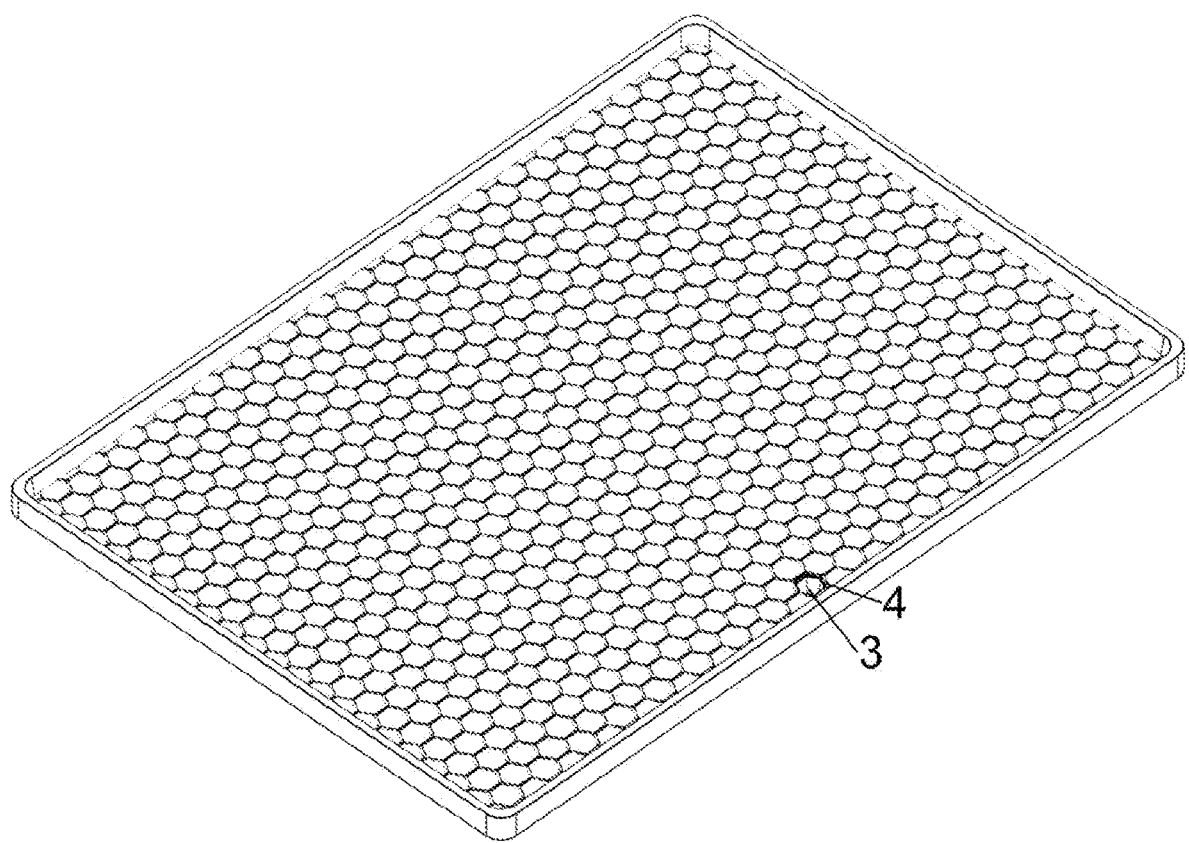
FIG. 4 is a schematic diagram of the overall structure of the waterproof pad according to another embodiment in Example 1.
Figure 5:
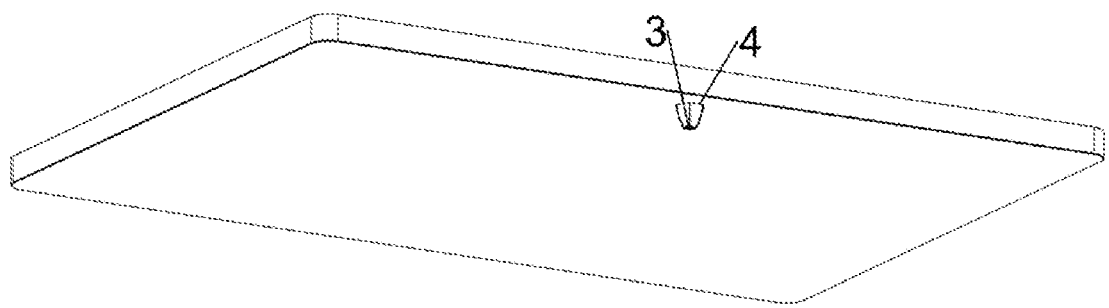
FIG. 5 is a schematic bottom view of the waterproof pad according to another embodiment in Example 1.

The drainage hole 3 has the function of turning up and down, the drainage hole 3 is convex when receiving water (as shown in FIG. 1 and FIG. 3), the drainage hole 3 is folded downward and is concave when draining water has shown in FIG. 4 and FIG. 5); when the drainage hole 3 is convex, the edge of the drainage hole 3 has a concave groove 4 around it, and the function of turning up and down is realized through the groove 4; the drainage hole 3 is hemispherical, on the one hand, it is for aesthetics, and on the other hand, it is for the convenience of the drainage hole 3 is folded up and down along the groove 4, and can improve the drainage efficiency; the height of the drainage hole 3 is equal to the height of the waterproof fence 2; the drainage hole 3 is located in the middle of the edge of the waterproof pad.

The inner surface of the pad body 1 (the inner surface is defined as the side that receives water leakage) has a honeycomb pattern. The structure of the honeycomb pattern is shown in FIGS. 1 and 3. On the one hand, the honeycomb pattern is designed for aesthetics, and on the other hand. On the one hand, the honeycomb pattern can receive a large amount of dripping water and prevent the dripping water from spreading on the pad body 1.

In this embodiment, the thickness of the waterproof pad is 1.8 mm, and the height of the waterproof fence 2 is 17 mm. The thickness of the waterproof and the height of the waterproof fence 2 can also be designed according to user requirements.

In this embodiment, the integral material of the waterproof pad is integrally formed silica gel. In some embodiments, materials such as natural rubber and other synthetic rubbers can also be used, and thermoplastic elastomer materials such as POE and SBS can also be used. In some embodiments, only the drainage hole 3 may be made of elastic material, and other parts of the waterproof pad except the drainage hole 3 may be made of other materials, such as aluminum or other metal materials or plastics.

Figure 6:
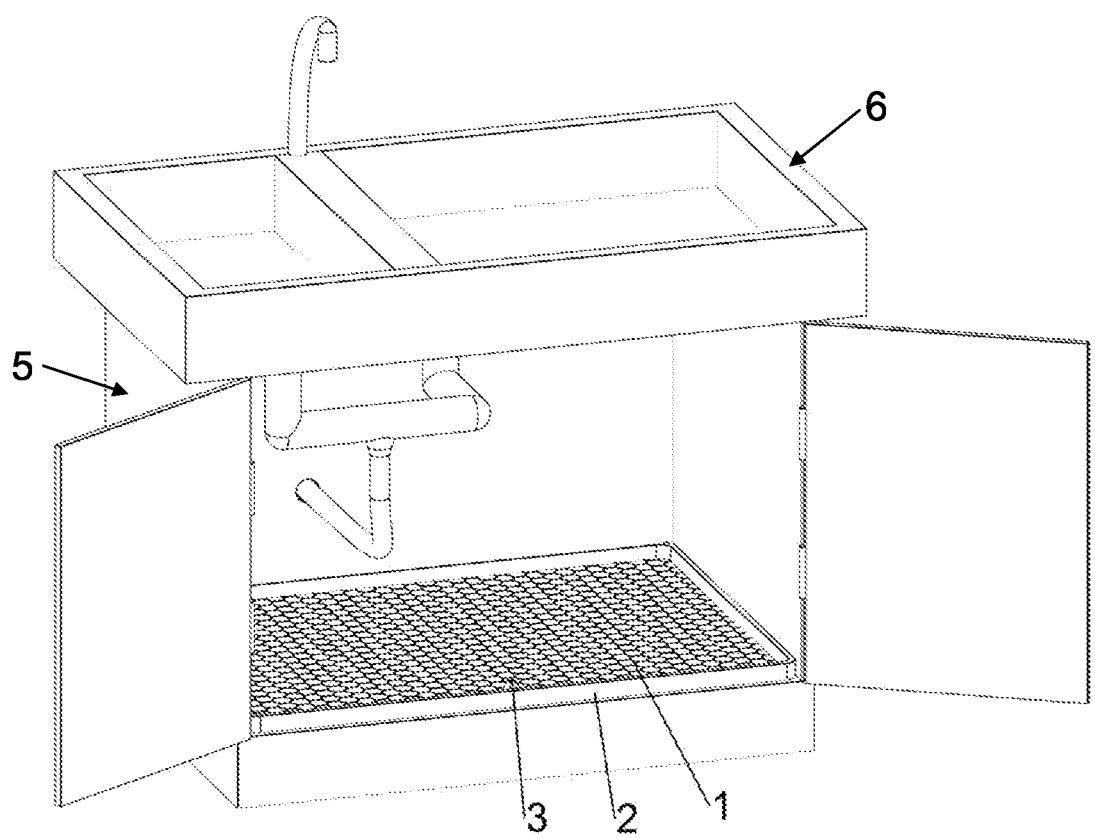
FIG. 6 is a schematic view of the waterproof pad which is assembled in an under-sink cabinet according to one embodiment in Example 1.
Figure 7:
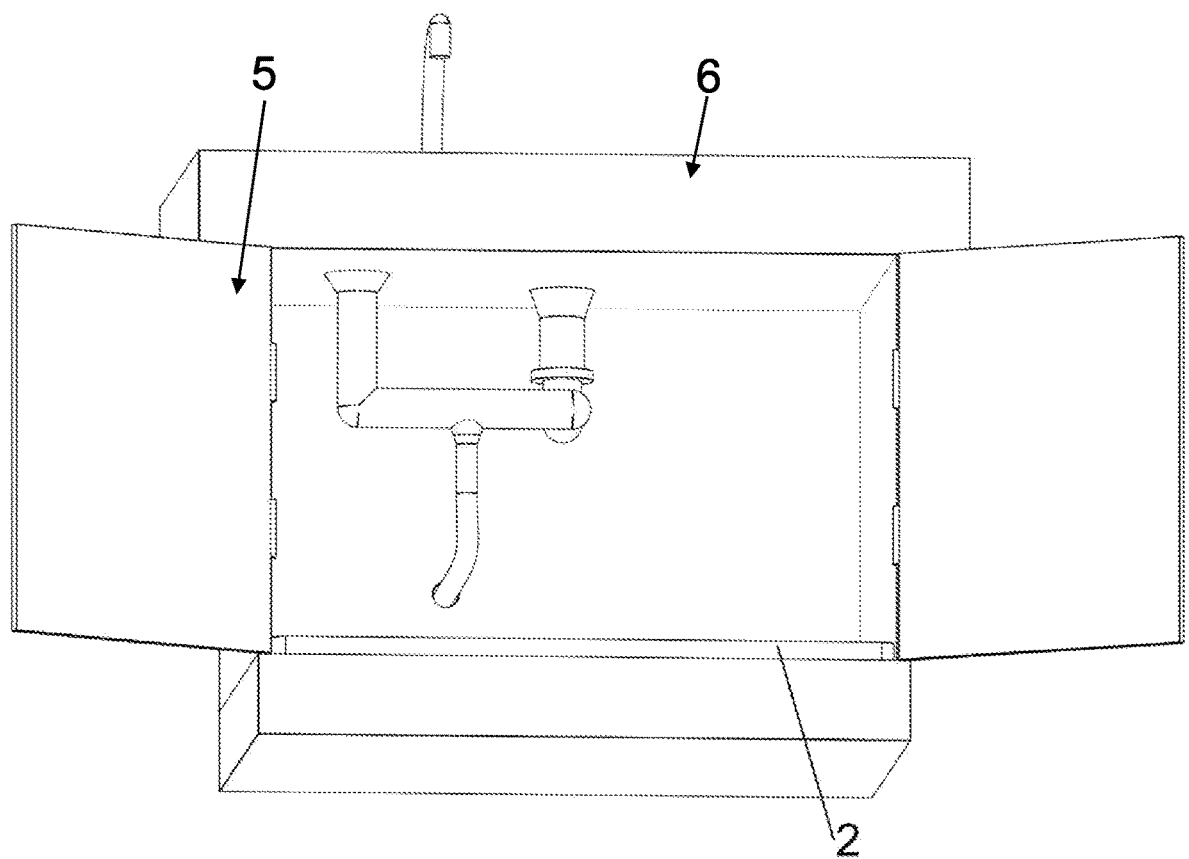
FIG. 7 is a schematic view of another view of the waterproof pad which is assembled in the under-sink cabinet according to one embodiment in Example 1.

In some embodiments, the waterproof pad of this embodiment is used as part of the waterproof structure of a cabinet 5 under a sink 6 (as shown in FIG. 6 and FIG. 7).

When in use, the waterproof pad of the present embodiment is placed in the cabinet 5 under the sink 6, bathroom sink, etc. as a waterproof structure, and the placed state is that the drainage hole 3 of the waterproof pad is raised and the height of the waterproof fence 2 is the same. When the pool leaks, the waterproof pad with the waterproof fence 2 can withstand the leakage and prevent the leakage from leaking out of the drainage hole 3 to contaminate the cabinet 5. When drainage is required, the waterproof pad with the drainage hole 3 is pulled out of the edge of the cabinet 5 and the drainage hole 3 is folded downward to form a concave shape, so that the received leaking water can be easily discharged from the drainage hole 3, which can save the user the trouble of removing the entire waterproof pad to clean up the leaking water.

What is claimed is:

1. A waterproof pad, including a pad body (1) and a waterproof fence (2), wherein the waterproof fence (2) is arranged around an edge of the pad body (1), the pad body (1) is further provided with a drainage hole (3), and the drainage hole (3) is located close to the waterproof fence (2); and
wherein the drainage hole (3) is in a convex shape when receiving water, and the drainage hole (3) is folded downward to be in a concave shape when draining water.

2. The waterproof pad according to claim 1, wherein, when the drainage hole (3) is in the convex shape, a periphery of the drainage hole (3) is provided with a groove (4) that is recessed, and an up-down folding function is embodied through the groove (4).

3. The waterproof pad according to claim 2, wherein the drainage hole (3) is hemispherical.

4. The waterproof pad according to claim 2, wherein a height of the drainage hole (3) is at least equal to a height of the waterproof fence (2).

5. The waterproof pad according to claim 2, wherein an inner surface of the pad body (1) has a honeycomb pattern.

6. The waterproof pad according to claim 2, wherein a thickness of the waterproof pad is 1.8 mm and a height of the waterproof fence is 17 mm.

7. The waterproof pad according to claim 2, wherein a material of the drainage hole (3) is an elastomer material.

8. The waterproof pad according to claim 2, wherein an overall material of the waterproof pad is an elastomer material.

9. The waterproof pad according to claim 1, wherein a height of the drainage hole (3) is at least equal to a height of the waterproof fence (2).

10. The waterproof pad according to claim 1, wherein an inner surface of the pad body (1) has a honeycomb pattern.

11. The waterproof pad according to claim 1, wherein a thickness of the waterproof pad is 1.8 mm and a height of the waterproof fence is 17 mm.

12. The waterproof pad according to claim 1, wherein a material of the drainage hole (3) is an elastomer material.

13. The waterproof pad according to claim 1, wherein an overall material of the waterproof pad is an elastomer material.

14. A waterproof structure for a cabinet under a sink, including the waterproof pad as claimed in claim 1.

15. The waterproof structure for a cabinet under a sink according to claim 14, wherein the drainage hole (3) is located in a middle of the edge of the waterproof pad.

16. The waterproof structure for a cabinet under a sink according to claim 14, wherein, when the drainage hole (3) is in the convex shape, a periphery of the drainage hole (3) is provided with a groove (4) that is recessed, and an up-down folding function is embodied through the groove (4).

17. The waterproof structure for a cabinet under a sink according to claim 16, wherein the drainage hole (3) is hemispherical.

18. The waterproof structure for a cabinet under a sink according to claim 14, wherein a height of the drainage hole (3) is at least equal to a height of the waterproof fence (2).

19. The waterproof structure for a cabinet under a sink according to claim 14, wherein a thickness of the waterproof pad is 1.8 mm and a height of the waterproof fence is 17 mm.

20. The waterproof structure for a cabinet under a sink according to claim 14, wherein an overall material of the waterproof pad is an elastomer material.

\* \* \* \* \*